(12) United States Patent
Cinagrossi et al.

(10) Patent No.: US 9,300,214 B2
(45) Date of Patent: Mar. 29, 2016

(54) MULTIPHASE CONVERTER WITH ACTIVE AND PASSIVE INTERNAL CURRENT SHARING

(71) Applicant: Power-One, Inc., Camarillo, CA (US)

(72) Inventors: Nicola Cinagrossi, Uster (CH); Urs Wild, Bäretswil (CH); Evan Espina, Uster (CH)

(73) Assignee: Power-One, Inc., Camarillo, CA (US)

( * ) Notice: Subject to any disclaimer, the term of this patent is extended or adjusted under 35 U.S.C. 154(b) by 188 days.

(21) Appl. No.: 14/208,011

(22) Filed: Mar. 13, 2014

(65) Prior Publication Data

US 2014/0268907 A1    Sep. 18, 2014

Related U.S. Application Data

(60) Provisional application No. 61/787,990, filed on Mar. 15, 2013.

(51) Int. Cl.
*H02M 3/335*    (2006.01)
*H02M 3/28*    (2006.01)
*H02M 1/00*    (2007.01)

(52) U.S. Cl.
CPC .......... *H02M 3/33507* (2013.01); *H02M 3/285* (2013.01); *H02M 3/33592* (2013.01); *H02M 2001/0032* (2013.01); *H02M 2001/0058* (2013.01); *Y02B 70/1433* (2013.01); *Y02B 70/1475* (2013.01); *Y02B 70/1491* (2013.01); *Y02B 70/16* (2013.01)

(58) Field of Classification Search
CPC ............ H02M 3/33507; H02M 3/285; H02M 3/33592; H02M 2001/0032; H02M 2001/0058; Y02B 70/1433; Y02B 70/1475; Y02B 70/1491; Y02B 70/16
See application file for complete search history.

(56) References Cited

U.S. PATENT DOCUMENTS 5,946,206 A * 8/1999 Shimizu et al. ................. 363/65
7,054,175 B2 * 5/2006 Kurio et al. ..................... 363/65
(Continued)

FOREIGN PATENT DOCUMENTS

JP    2009254227 A    10/2009
JP    2012010420 A    1/2012

OTHER PUBLICATIONS

International Search Report in corresponding International Application No. PCT/US2014/027317, dated Aug. 11, 2014, 10 pp.

*Primary Examiner* — Jue Zhang
(74) *Attorney, Agent, or Firm* — Patterson Intellectual Property Law, P.C.; Mark J. Patterson; Gary L. Montle

(57) ABSTRACT

A multiphase DC-DC converter includes multiple groups of first and second LLC power trains coupled in parallel which collectively provide an output voltage to a load. A voltage feedback control loop senses an output voltage for the LLC converter and generates an identical reference current signal for each of the multiple groups of power trains, the signals representing a reference current based on the sensed output voltage, wherein an active current sharing operation is provided between each of the groups. A local current control loop for each of the groups generates PWM control signals to each of the respective first and second power trains based on the reference current, the PWM control signals having an identical frequency but out of phase with respect to each other, wherein a passive current sharing operation is provided within each of the plurality of power groups.

20 Claims, 3 Drawing Sheets

(56) References Cited

U.S. PATENT DOCUMENTS

| | | |
|---|---|---|
| 7,796,408 B2 | 9/2010 | Wang et al. |
| 2008/0298093 A1* | 12/2008 | Jin et al. .................... 363/21.06 |
| 2009/0231887 A1* | 9/2009 | Ye et al. ..................... 363/21.02 |
| 2009/0243388 A1 | 10/2009 | Kim et al. |
| 2010/0328968 A1 | 12/2010 | Adragna et al. |
| 2011/0007527 A1* | 1/2011 | Liu et al. .................... 363/21.02 |
| 2011/0080146 A1* | 4/2011 | Li et al. ......................... 323/237 |
| 2012/0153730 A1* | 6/2012 | Barnett et al. .................. 307/82 |
| 2012/0262955 A1* | 10/2012 | Yan et al. .................... 363/21.02 |
| 2012/0275197 A1* | 11/2012 | Yan et al. .................... 363/21.02 |
| 2013/0088899 A1 | 4/2013 | Iwata |

* cited by examiner

US 9,300,214 B2

MULTIPHASE CONVERTER WITH ACTIVE AND PASSIVE INTERNAL CURRENT SHARING

CROSS-REFERENCES TO RELATED APPLICATIONS

This application claims benefit of the following patent application which is hereby incorporated by reference: U.S. Provisional Patent Application No. 61/787,990 filed Mar. 15, 2013, entitled "MULTIPHASE CONVERTER WITH ACTIVE AND PASSIVE INTERNAL CURRENT SHARING."

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to resonant power conversion systems. More particularly, the present invention relates to a multiphase LLC DC-DC power converter with both active and passive internal current sharing.

Current requirements for high efficiency (e.g., greater than 94%) in AC/DC power supplies with a 12 volt output has resulted in the common use of parallel power stages/power trains to minimize current stress in each power train and the output of the power supply unit. For best performance and reliable operation, different active or passive current sharing methods have been implemented in the past.

To further improve performance and power density, and especially also to achieve flat efficiency curves across the load range, new solutions have been implemented in recent years, including for example using more than two power trains with active phase shedding (dynamic turning on/off of phases). It is critical to control the current in each phase since a single phase (e.g., one of N total phases) can typically only handle slightly more than 1/N of the overall power. With systems having an increased number of phases (N), this problem becomes even more pronounced.

BRIEF SUMMARY OF THE INVENTION

To achieve the highest possible efficiencies, power conversion systems as described herein may typically include LLC power stages, as these topologies have reduced switching losses as compared with hard-switched topologies like PWM controlled half/full-bridge forward-type converters.

An exemplary multiphase power converter according to the present invention may include a plurality of power groups, each group defined by first and second LLC power trains coupled in parallel. Each of the power trains includes a plurality of switching elements and a resonant circuit having an associated resonant frequency. The plurality of power groups are configured to collectively provide an output voltage to a load.

One or more control circuits regulate a passive current sharing operation for each of the first and second power trains within each respective power group, and are further effective to regulate active current sharing operation between each of the plurality of power groups.

In another aspect of the present invention, the control circuits may include a plurality of current mode controllers, each of which is associated with a respective one of the plurality of power groups. The switching elements for each of the first and second power trains within a power group are driven with a respective frequency given by a respective controller, which may typically be the same frequency but at different phases.

In another aspect of the present invention, the switching elements of first and second power trains within any of the plurality of power groups may each be driven at an operating frequency above the resonant frequency for the respective power train during normal operating conditions, and may further each be driven at an operating frequency below the resonant frequency for the respective power train during abnormal operating conditions.

In yet another aspect of the present invention, a plurality of current mode controllers are each associated with a respective one of the plurality of power groups, with each current mode controller receiving an identical reference current generated from an output voltage feedback loop, wherein each of the plurality of power groups are driven by a respective controller to generate an identical output current.

In yet another aspect of the present invention, each current mode controller provides PWM control signals of an identical frequency to its respective power trains.

In yet another aspect of the present invention, a phase manager is provided to monitor a collective output current for the power converter and to provide enabling signals and disabling signals to the current mode controllers, each current mode controller responsive to an enabling signal or a disabling signal from the phase manager to respectively enable or disable one or more associated power trains.

A voltage controller is further provided to generate a reference current signal based on a sensed output voltage for the power converter, and each of the current mode controllers and the voltage controller are effective to modify one or more operating parameters as a function of a received enabling signal or disabling signal.

DETAILED DESCRIPTION OF THE INVENTION

Figure 1:
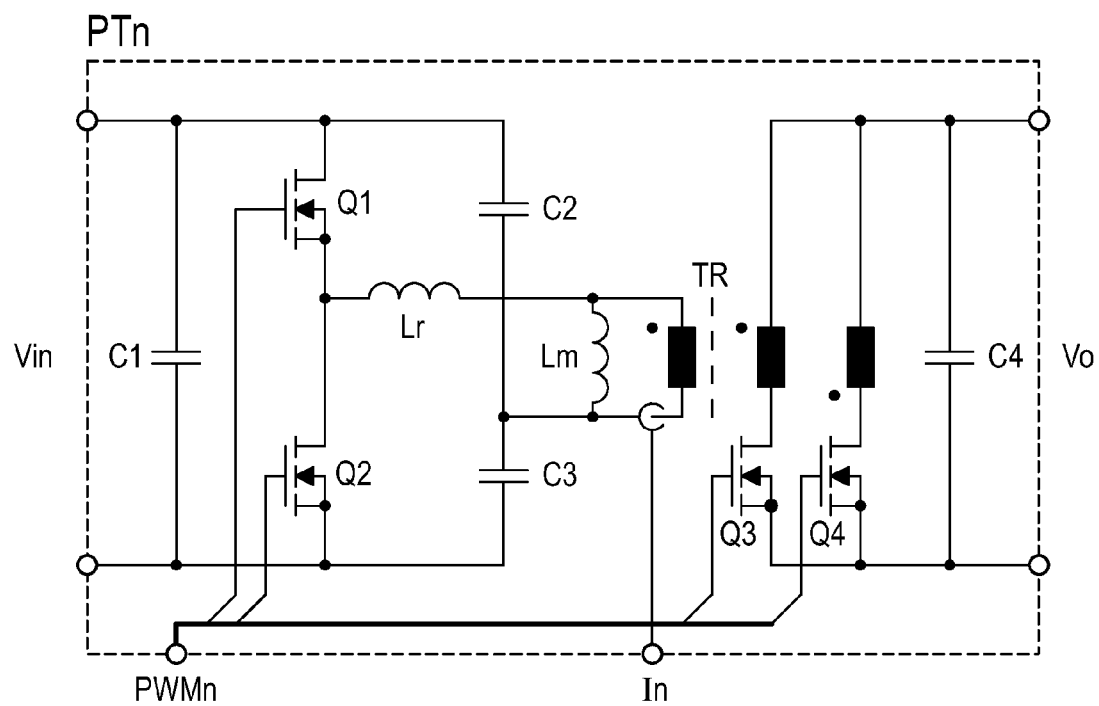
FIG. 1 is a circuit diagram representing an exemplary power train according to an embodiment of the present invention.
Figure 2:
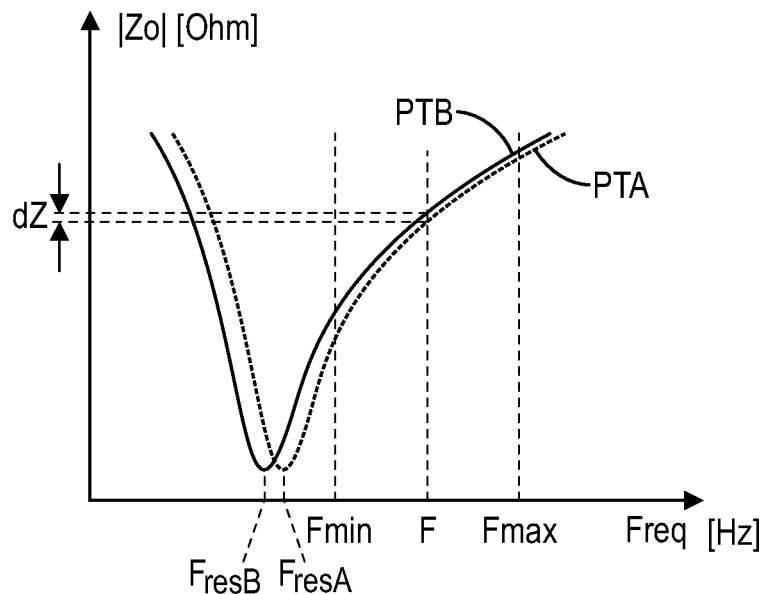
FIG. 2 is a graphical diagram representing an exemplary open loop output impedance of the power train of FIG. 1.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

Conditional language used in this description, including without limitations terms such as "can," "might," "may," "e.g.," and the like, unless specifically stated otherwise, or otherwise understood within the context as used, is generally intended to convey that certain embodiments include, while other embodiments do not necessarily include, certain features, elements and/or states. Thus, such conditional language is not generally intended to imply that features, elements and/or states are in any way required for one or more embodiments.

The term "coupled" means at least either a direct electrical connection between the connected items or an indirect connection through one or more passive or active intermediary devices.

The term "circuit" means at least either a single component or a multiplicity of components, either active and/or passive, that are coupled together to provide a desired function.

The term "signal" as used herein may include any meanings as may be understood by those of ordinary skill in the art, including at least an electric or magnetic representation of current, voltage, charge, temperature, data or a state of one or more memory locations as expressed on one or more transmission mediums, and generally capable of being transmitted, received, stored, compared, combined or otherwise manipulated in any equivalent manner.

The terms "switching element" and "switch" may be used interchangeably and may refer herein to at least: a variety of transistors as known in the art (including but not limited to FET, BJT, IGBT, JFET, etc.), a switching diode, a silicon controlled rectifier (SCR), a diode for alternating current (DIAC), a triode for alternating current (TRIAC), a mechanical single pole/double pole switch (SPDT), or electrical, solid state or reed relays. Where either a field effect transistor (FET) or a bipolar junction transistor (BJT) may be employed as an embodiment of a transistor, the scope of the terms "gate," "drain," and "source" includes "base," "collector," and "emitter," respectively, and vice-versa.

Referring generally to FIGS. 1-4, various embodiments of a power conversion system of the present invention may now be described. Where the various figures may describe embodiments sharing various common elements and features with other embodiments, similar elements and features are given the same reference numerals and redundant description thereof may be omitted below.

Referring now to FIG. 1, an exemplary embodiment of an LLC power train PTn includes first and second switching elements Q1, Q2 in a conventional half-bridge configuration coupled in series across input terminals (e.g., first and second ends of capacitor C1) to receive an input voltage Vin. A series resonant circuit is formed of resonant inductor Lr and resonant capacitors C2, C3. A main transformer TR with magnetizing inductance Lm provides isolation between input and output sides of the power train PTn. Current may be measured via a current sensor coupled between the (external) magnetizing inductor Lm and the primary winding of the main transformer TR.

On the output side, switching elements Q3, Q4 are provided as synchronous rectifiers, and may be coupled as shown in a center tap configuration for further improved efficiency. The center tap is coupled to a first output terminal, with opposing ends of the synchronous rectifiers Q3, Q4 coupled to a second output terminal, with an output capacitor C4 further coupled across the terminals and an output voltage Vo measured across the output terminals.

It may be noted that alternative implementations of an LLC stage (not shown) are known to those of skill in the art and may be considered within the scope of the present invention. For example, with respect to the input side of a power train, only one resonant capacitor (either C2 or C3) may be provided, and/or the magnetizing inductance Lm may be integrated into the primary winding of the main transformer TR. On the output side, the synchronous rectifiers may be replaced with passive diodes on opposing ends of the split output windings of the main transformer TR, or a single output winding of the main transformer TR may be provided with a full bridge rectifier circuit, or more than two synchronous rectifier switches may be arranged in a full bridge configuration, etc. Further, the current sensor may be coupled at any of a number of different current measurement locations in the power train.

In a preferred embodiment, the LLC stage is operated at or very near the series resonant frequency: $F_{res}=1/(2\pi/8\sqrt{Lr*C2\|C3})$.

A typical open loop output impedance of the LLC stage described above is further represented in FIG. 2. By paralleling two LLC stages $PT_A$ and $PT_B$ and using the same, but out of phase, control signals for both stages one may achieve a much lower ripple current on the output, which reduces stress in the output capacitor(s) C4. The paralleled stages $PT_A$, $PT_B$ may need to be operated slightly offset from, but typically above their respective resonant frequencies FresA, FresB. This is because the higher open loop output impedance of the LLC stages will tend to automatically equalize the loading of both phases. It may be noted that component tolerances have less effect the further away from their respective resonant frequencies FresA, FresB the LLC stages $PT_A$, $PT_B$ are operated. On the other hand, to keep efficiency as high as possible, a close operating point to the resonant frequency may be preferred.

In various embodiments, the operating frequencies for LLC stages may be regulated to be above their respective resonant frequencies during a normal (steady-state) operating condition, and below the resonant frequency during an abnormal operating condition, such as for example during startup or a power interruption.

Figure 3:
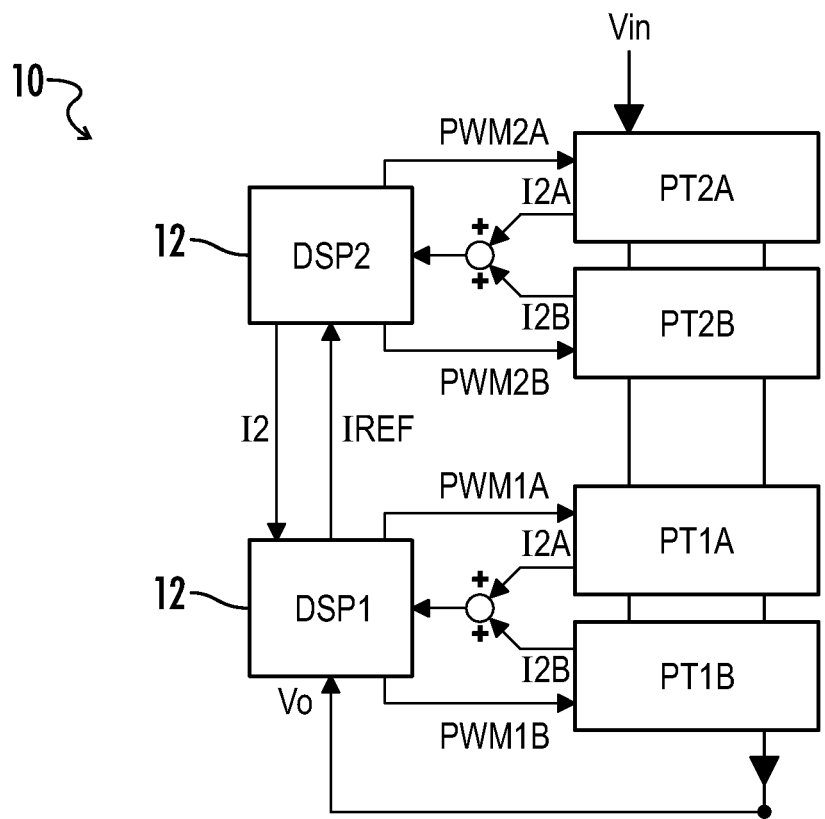
FIG. 3 is a block diagram representing an exemplary multiphase power converter according to an embodiment of the present invention.

Referring now to FIG. 3, an exemplary embodiment of a power supply 10 according to the present invention may include a first pair of power trains PT1A, PT1B and a second pair of power trains PT2A, PT2B. By adding more phases to the power supply, it becomes even more critical to assure reasonable current sharing among all phases to prevent overloading of a single phase. A combination of a passive and an active current sharing process is provided to control operation and loading for each power train. The multiphase (in this case four phases) power supply 10 further includes common input Vin and common output Vo terminals. One or more associated controllers are organized such that a pair of power trains (i.e., phases) always share a portion of the controls. These controllers regulate the sum of the currents of a pair of power trains. For example, control circuitry for the first pair of power trains PT1A, PT1B regulates the current sum I1A+I1B.

The controllers for the various pairs of power trains may be split into separate respective controllers such as, e.g., digital signal processors DSP1, DSP2, or may alternatively be combined into a single processor (not shown).

In accordance with embodiments of the present invention, each controller receives the same current reference Iref and therefore pairs of power trains will provide the same total current to the output (i.e., active current sharing). Each power train in a single pair will share the current with the other power train in the same respective pair because of its similar open loop output impedance (i.e., passive current sharing) and the offset frequency operation. The common current reference Iref may be generated by an outer voltage feedback loop regulating the output voltage Vo of the power supply 10. Since a pair of power trains as described always runs with the same (but out of phase) control signals, ripple current on the output is minimized, yet effective current sharing between pairs of power trains is provided by the same current reference into each respective controller.

Figure 4:
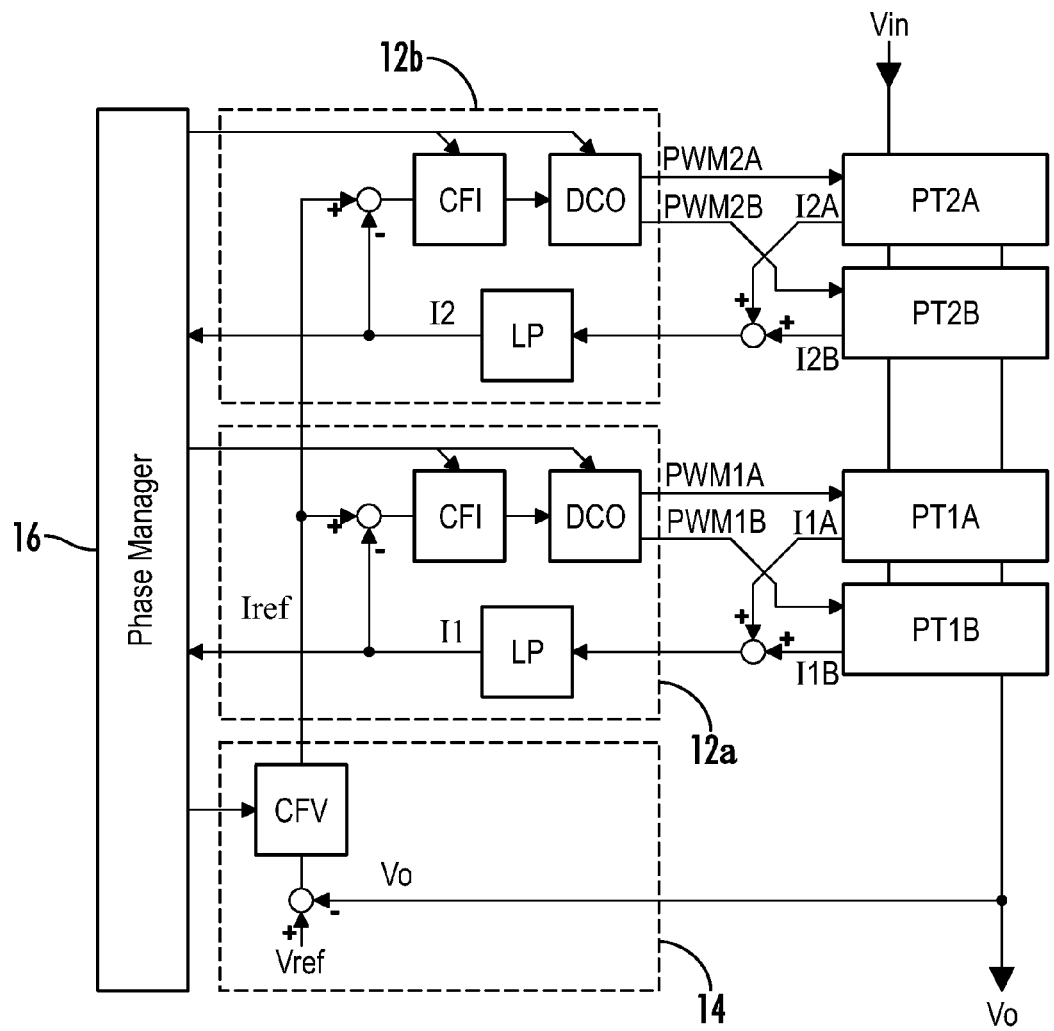
FIG. 4 is a block diagram representing an exemplary multiphase power converter according to another embodiment of the present invention.

Referring now to FIG. 4, another exemplary embodiment of a power supply 10 configured according to the present invention also includes a first pair of LLC power trains PT1A, PT1B and a second pair of LLC power trains PT2A, PT2B. The overall control circuit as shown is divided into four primary control modules—a voltage controller 14; a first average current mode controller 12a controlling the first pair of power trains PT1A, PT1B, a second average current mode controller 12b controlling the second pair of power trains PT2A, PT2B, and a phase manager 16 interacting with each of the other control modules.

The voltage controller 14 measures the output voltage Vo and compares it to a reference value Vref to determine a voltage error. A compensation filter CFV generates from the voltage error the current reference Iref that is distributed to all downstream current mode controllers 12. Each current mode controller 12 receives the same current reference Iref and therefore will control the current of its respective power train to provide that amount of current to the output. This actively shares the current among the pairs of power trains.

Each current controller 12 receives the sum of the associated power train components InA, InB and passes the sum through a low pass filter LP to remove superimposed high frequency ripple and noise, resulting in an average measure of the current In. The average current In is compared in each controller against the common current reference Iref. The detected error passes a loop compensation filter CFI and controls the digitally controlled oscillator DCO, wherein pulse trains PWMnA, PWMnB are generated to control the switching elements in the respective power trains PTnA, PTnB.

The pulse trains within a given pair PWMnA, PWMnB have substantially the same frequency, but may preferably be out of phase to minimize the ripple current on the output of the power trains as explained earlier. Also, the PWM signals may typically be generated such that the pair of power trains are operating at frequencies slightly above their respective resonant frequencies (e.g., approximately 10% to 20% at full load) such that the effect of component tolerances result in less differential current between the power trains in the pair (i.e., passive current sharing).

In addition to the voltage and current controllers, a phase manager 16 may enable on/off switching of one or more power trains in a given pair of power trains to further boost efficiency under specific load conditions. For example, in an exemplary embodiment at light load (typically less than 15% of the nominal load) only one power train may be enabled. At higher loads (e.g., up to 40% of the nominal load), two power trains might be enabled. At a top range of loads (e.g., all those greater than 40% of the nominal load), all of the power trains may accordingly be enabled.

Enabling and disabling power trains may require operating control blocks with a different scaling. Therefore, the phase manager 16 may for example reprogram the compensation filters CFI with different coefficients to assure smooth transitions between different operating states with respect to the number of phases in operation.

It may be understood that the proposed passive/active current sharing control method is not necessarily limited to a four-phase power supply. It can be expanded to 2N phases of power supply (wherein N=2, 3, 4, . . . ). Each pair of power trains will share the current passively within the pair, and actively between multiple pairs.

The previous detailed description has been provided for the purposes of illustration and description. Thus, although there have been described particular embodiments of the present invention of a new and useful "multiphase LLC converter with active and passive current sharing," it is not intended that such references be construed as limitations upon the scope of this invention except as set forth in the following claims.

Thus, although there have been described particular embodiments of the present invention of a new and useful MULTIPHASE CONVERTER WITH ACTIVE AND PASSIVE INTERNAL CURRENT SHARING it is not intended that such references be construed as limitations upon the scope of this invention except as set forth in the following claims.

What is claimed is:

1. A multiphase power converter comprising:
    a plurality of power groups, each group comprising first and second LLC power trains coupled in parallel, each of the power trains comprising a plurality of switching elements and a resonant circuit having an associated resonant frequency, the plurality of power groups configured to collectively provide an output voltage to a load; and
    one or more control circuits effective to regulate passive current sharing operation for each of the first and second power trains within each respective power group,
    the one or more control circuits further effective to regulate active current sharing operation between each of the plurality of power groups.

2. The power converter of claim 1, the control circuits comprising a plurality of current mode controllers, each current mode controller associated with a respective one of the plurality of power groups, wherein the switching elements for each of the first and second power trains within a power group are driven with a respective frequency given by a respective controller.

3. The power converter of claim 2, wherein the switching elements of first and second power trains within any of the plurality of power groups are driven at the same frequency.

4. The power converter of claim 3, wherein the switching elements of first and second power trains within any of the plurality of power groups are each driven at an operating frequency above the resonant frequency for the respective power train during normal operating conditions.

5. The power converter of claim 4, wherein the switching elements of first and second power trains within any of the plurality of power groups are each driven at an operating frequency below the resonant frequency for the respective power train during abnormal operating conditions.

6. The power converter of claim 1, the control circuits comprising a plurality of current mode controllers, each current mode controller associated with a respective one of the plurality of power groups, each current mode controller receiving an identical reference current generated from an output voltage feedback loop, wherein each of the plurality of power groups are driven by a respective controller to generate an identical output current.

7. The power converter of claim 6, each current mode controller effective to provide PWM control signals of an identical frequency to its respective power trains.

8. The power converter of claim 6, the control circuits further comprising a phase manager circuit effective to monitor a collective output current for the power converter and to provide enabling signals and disabling signals to the current mode controllers, each current mode controller responsive to an enabling signal or a disabling signal from the phase manager to respectively enable or disable one or more associated power trains.

9. The power converter of claim 8, the output voltage feedback loop further comprising a voltage controller effective to generate a reference current signal based on a sensed output voltage for the power converter,
wherein each of the current mode controllers and the voltage controller are effective to modify one or more operating parameters as a function of a received enabling signal or disabling signal.

10. A method of providing passive and active internal current sharing for a multiphase LLC converter comprising a plurality of power groups, each group further comprising first and second LLC power trains, the method comprising the steps of:
sensing an output voltage for the LLC converter;
generating an identical reference current signal for each of the plurality of power groups, the signals representing a reference current based on the sensed output voltage, wherein an active current sharing operation is provided between each of the plurality of power groups;
for each of the plurality of power groups, generating PWM control signals to each of the respective first and second power trains based on the reference current, the PWM control signals having an identical frequency but out of phase with respect to each other, wherein a passive current sharing operation is provided within each of the plurality of power groups.

11. The method of claim 10, wherein the first and second power trains within any of the plurality of power groups are each driven based on the PWM control signals at an operating frequency above a resonant frequency for the respective power train during normal operating conditions.

12. The method of claim 11, wherein the first and second power trains within any of the plurality of power groups are each driven based on the PWM control signals at an operating frequency below the resonant frequency for the respective power train during abnormal operating conditions.

13. The method of claim 10, further comprising:
monitoring a collective output current for the power converter; and
providing enabling signals and disabling signals to respectively enable or disable one or more power trains in each of the plurality of power groups.

14. The method of claim 13, further comprising at one or more of the plurality of power groups modifying one or more operating parameters as a function of a received enabling signal or disabling signal.

15. A multiphase power converter comprising:
a plurality of power groups, each group comprising first and second LLC power trains coupled in parallel, each of the power trains comprising a plurality of switching elements and a resonant circuit having an associated resonant frequency, the plurality of power groups configured to collectively provide an output voltage to a load;
a feedback control loop effective to sense an output voltage for the LLC converter and to generate an identical reference current signal for each of the plurality of power groups, the signals representing a reference current based on the sensed output voltage, wherein an active current sharing operation is provided between each of the plurality of power groups; and
a local current control loop for each of the plurality of power groups, each local control loop effective to generate PWM control signals to each of the respective first and second power trains based on the reference current, the PWM control signals having an identical frequency but out of phase with respect to each other, wherein a passive current sharing operation is provided within each of the plurality of power groups.

16. The power converter of claim 15, wherein the first and second power trains within any of the plurality of power groups are each driven based on the PWM control signals at an operating frequency above a resonant frequency for the respective power train during normal operating conditions.

17. The power converter of claim 16, wherein the first and second power trains within any of the plurality of power groups are each driven based on the PWM control signals at an operating frequency below the resonant frequency for the respective power train during abnormal operating conditions.

18. The power converter of claim 15, further comprising a phase manager control loop effective to monitor a collective output current for the power converter, and to provide enabling signals and disabling signals to respectively enable or disable one or more power trains in each of the plurality of power groups.

19. The power converter of claim 18, each of the local current control loops and the feedback control loop further effective to modify one or more operating parameters as a function of a received enabling signal or disabling signal.

20. The power converter of claim 19, a number of enabled power trains in the power converter corresponding to the monitored output current for the power converter, the one or more operating parameters for a given power group modified in view of a number of enabled or disabled power trains in said power group.

* * * * *